United States Patent
Thorson et al.

(10) Patent No.: US 11,278,949 B2
(45) Date of Patent: Mar. 22, 2022

(54) PEX CRIMPING TOOL

(71) Applicant: MILWAUKEE ELECTRIC TOOL CORPORATION, Brookfield, WI (US)

(72) Inventors: Troy C. Thorson, Cedarburg, WI (US); Jeffrey M. Wackwitz, Waukesha, WI (US); Kyle J. Radovich, West Bend, WI (US); Jonathon R. Gasteiner, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 323 days.

(21) Appl. No.: 16/275,486

(22) Filed: Feb. 14, 2019

(65) Prior Publication Data
US 2019/0176207 A1    Jun. 13, 2019

Related U.S. Application Data

(63) Continuation of application No. 15/723,647, filed on Oct. 3, 2017, now Pat. No. 10,213,821, which is a
(Continued)

(51) Int. Cl.
*B21D 39/04* (2006.01)
*B25B 7/02* (2006.01)
(Continued)

(52) U.S. Cl.
CPC .............. *B21D 39/04* (2013.01); *B21D 15/04* (2013.01); *B23D 15/04* (2013.01); *B25B 7/02* (2013.01);
(Continued)

(58) Field of Classification Search
CPC .......... B23Q 3/00; B23P 11/00; B23P 11/005; B21D 39/04; B25B 7/02; B25B 7/10; B25B 7/12; B25B 27/10; B25B 27/146
(Continued)

(56) References Cited

U.S. PATENT DOCUMENTS

3,704,620 A    12/1972  Allen
3,774,301 A *  11/1973  Brown ................... B23D 29/02
                                                    30/186
(Continued)

FOREIGN PATENT DOCUMENTS

DE    1812109 A1       6/1970
FR    3010254 A1 *     3/2015    ............... H02K 7/06
FR    3010254 A1       3/2015

OTHER PUBLICATIONS

European Patent Office Examination Report for Application No. 16163737.6 dated Nov. 11, 2019 (7 pages).
(Continued)

*Primary Examiner* — Edward T Tolan
*Assistant Examiner* — Jared O Brown
(74) *Attorney, Agent, or Firm* — Michael Best & Friedrich LLP

(57) ABSTRACT

A power tool includes an outer housing having a drive unit support portion and a handle portion, an inner housing positioned at least partially within the outer housing, and a drive unit positioned in the drive unit support portion, the drive unit including an output member. The power tool also includes a power screw mechanism with a nut fixed relative to the outer housing and a screw coupled for co-rotation with the output member and axially movable relative to the output member. The screw is in threaded engagement with the nut such that the screw moves axially in response to rotation of the screw relative to the nut. The power tool also includes a working assembly coupled to the inner housing for movement in response to axial movement of the screw.

17 Claims, 8 Drawing Sheets

Related U.S. Application Data continuation of application No. 15/088,199, filed on Apr. 1, 2016, now Pat. No. 9,808,851.

(60) Provisional application No. 62/192,638, filed on Jul. 15, 2015, provisional application No. 62/141,957, filed on Apr. 2, 2015.

(51) Int. Cl.
    *B21D 15/04*      (2006.01)
    *B25B 27/14*      (2006.01)
    *B25B 27/10*      (2006.01)
    *F16H 25/20*      (2006.01)
    *B23D 15/04*      (2006.01)
    *G05B 19/23*      (2006.01)
    *G01D 5/245*      (2006.01)

(52) U.S. Cl.
CPC ............ *B25B 27/10* (2013.01); *B25B 27/146* (2013.01); *F16H 25/20* (2013.01); *G01D 5/2458* (2013.01); *G05B 19/232* (2013.01)

(58) Field of Classification Search
USPC .... 29/235, 243.5, 243.522, 243.523, 243.53, 29/243.55
See application file for complete search history.

(56) References Cited

U.S. PATENT DOCUMENTS

| | | |
|---|---|---|
| 4,265,347 A | 5/1981 | Dischler |
| 4,647,827 A | 3/1987 | Toyoda et al. |
| 5,094,097 A | 3/1992 | Tooth |
| 5,187,993 A | 2/1993 | Nicholson |
| 5,250,884 A | 10/1993 | Okumura |
| 5,410,903 A | 5/1995 | Schneider |
| 5,511,439 A | 4/1996 | Las Navas Garcia |
| 5,727,417 A * | 3/1998 | Moffatt ................... B21F 15/06 72/453.03 |
| 6,076,330 A | 6/2000 | Thomas |
| 6,196,045 B1 | 3/2001 | Thomas |
| 6,240,626 B1 | 6/2001 | Nghiem |
| 6,269,675 B1 | 8/2001 | Burnett |
| 6,434,998 B2 | 8/2002 | Amherd |
| 6,662,620 B1 | 12/2003 | Baron |
| 6,670,734 B2 | 12/2003 | Morishima |
| 6,938,531 B2 | 9/2005 | Yoshimizu |
| 7,155,955 B2 | 1/2007 | Hamm et al. |
| 7,216,523 B2 | 5/2007 | Frenken |
| 7,434,440 B2 | 10/2008 | Fay |
| 7,454,578 B2 | 11/2008 | Fields |
| 7,633,246 B2 | 12/2009 | Bernier |
| 7,823,433 B2 | 11/2010 | Zhang |
| 7,878,790 B2 | 2/2011 | Kidd |
| 7,954,356 B1 | 6/2011 | Erbrick |
| 8,336,362 B2 | 12/2012 | Frenken |
| 8,517,715 B2 | 8/2013 | Thorson |
| 9,631,710 B1 | 4/2017 | Slinger et al. |
| 9,808,851 B2 | 11/2017 | Thorson |
| 2003/0230132 A1 | 12/2003 | Bowles |
| 2006/0272381 A1* | 12/2006 | Ayer ....................... B25B 27/10 72/453.16 |
| 2009/0031778 A1 | 2/2009 | Hamm |
| 2009/0293577 A1 | 12/2009 | Hamm |
| 2010/0000288 A1* | 1/2010 | Barezzani ................ B21J 15/20 72/453.15 |
| 2013/0062339 A1 | 3/2013 | DeRosa |

OTHER PUBLICATIONS

European Patent Office Action for Application No. 16163737.6 dated Mar. 13, 2019, 5 pages.

\* cited by examiner

PEX CRIMPING TOOL

CROSS-REFERENCE TO RELATED APPLICATIONS

This application is a continuation of co-pending U.S. patent application Ser. No. 15/723,647, filed Oct. 3, 2017, now U.S. Pat. No. 10,213,821, which is a continuation of U.S. patent application Ser. No. 15/088,199, filed Apr. 1, 2016, now U.S. Pat. No. 9,808,851, which claims priority to U.S. Provisional Patent Application No. 62/141,957, filed Apr. 2, 2015, and U.S. Provisional Patent Application No. 62/192,638, filed Jul. 15, 2015, the entire contents of all of which are incorporated herein by reference.

FIELD OF THE INVENTION

The present invention relates to power tools, and more particularly to PEX (cross-linked polyethylene) crimping tools.

BACKGROUND OF THE INVENTION

Polymer tubing is gaining popularity in residential home and commercial building construction due to the rising cost of copper pipe. One of the more common types of polymer tubing is made from cross-linked polyethylene, commonly known as PEX. Polymer tubing is typically attached to fittings using compression or crimped connectors. These connectors are compressed onto the PEX tubing using a crimping tool. Manual crimping tools, typically including a pair of handles for actuating a pair of crimper jaws by a pivoting linkage arrangement, are well known.

SUMMARY OF THE INVENTION

The invention provides, in one aspect, a power tool including an outer housing having a drive unit support portion and a handle portion, an inner housing positioned at least partially within the outer housing, and a drive unit positioned in the drive unit support portion, the drive unit including an output member. The power tool also includes a power screw mechanism with a nut fixed relative to the outer housing and a screw coupled for co-rotation with the output member and axially movable relative to the output member. The screw is in threaded engagement with the nut such that the screw moves axially in response to rotation of the screw relative to the nut. The power tool also includes a working assembly coupled to the inner housing for movement in response to axial movement of the screw.

The invention provides, in another aspect, a power tool including an outer housing having a drive unit support portion and a handle portion, an inner housing positioned at least partially within the outer housing, and a drive unit positioned in the drive unit support portion, the drive unit including an output member. The power tool also includes a roller carriage movable between a retracted position and an extended position in response to rotation of the output member, and a working assembly movable in response to contact with the roller carriage. The working assembly includes first and second jaws pivotally coupled to the inner housing, a pin positioned between the first and second jaws and having a circumferential groove, and a biasing member at least partially received within the circumferential groove, the biasing member configured to bias the first and second jaws toward a closed position.

The invention provides, in another aspect, a power tool including an outer housing with a drive unit support portion and a handle portion, an inner housing positioned at least partially within the outer housing, and a drive unit positioned in the drive unit support portion and including an output member having a plurality of internal splines. The power tool also includes a power screw mechanism with a nut fixed relative to the outer housing, a screw in threaded engagement with the nut such that the screw moves axially in response to rotation of the screw relative to the nut, and a splined member fixed to the screw, the splined member including a plurality of external splines meshed with the internal splines of the output member. The power tool also includes a working assembly coupled to the inner housing for movement in response to axial movement of the screw.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-5 illustrate a power tool 10, which is a PEX crimping tool 10 in the illustrated embodiment. In other embodiments, the power tool 10 may be configured as any of a wide range of power tools (e.g., cutters, knockout punches, etc.).

Figure 1:
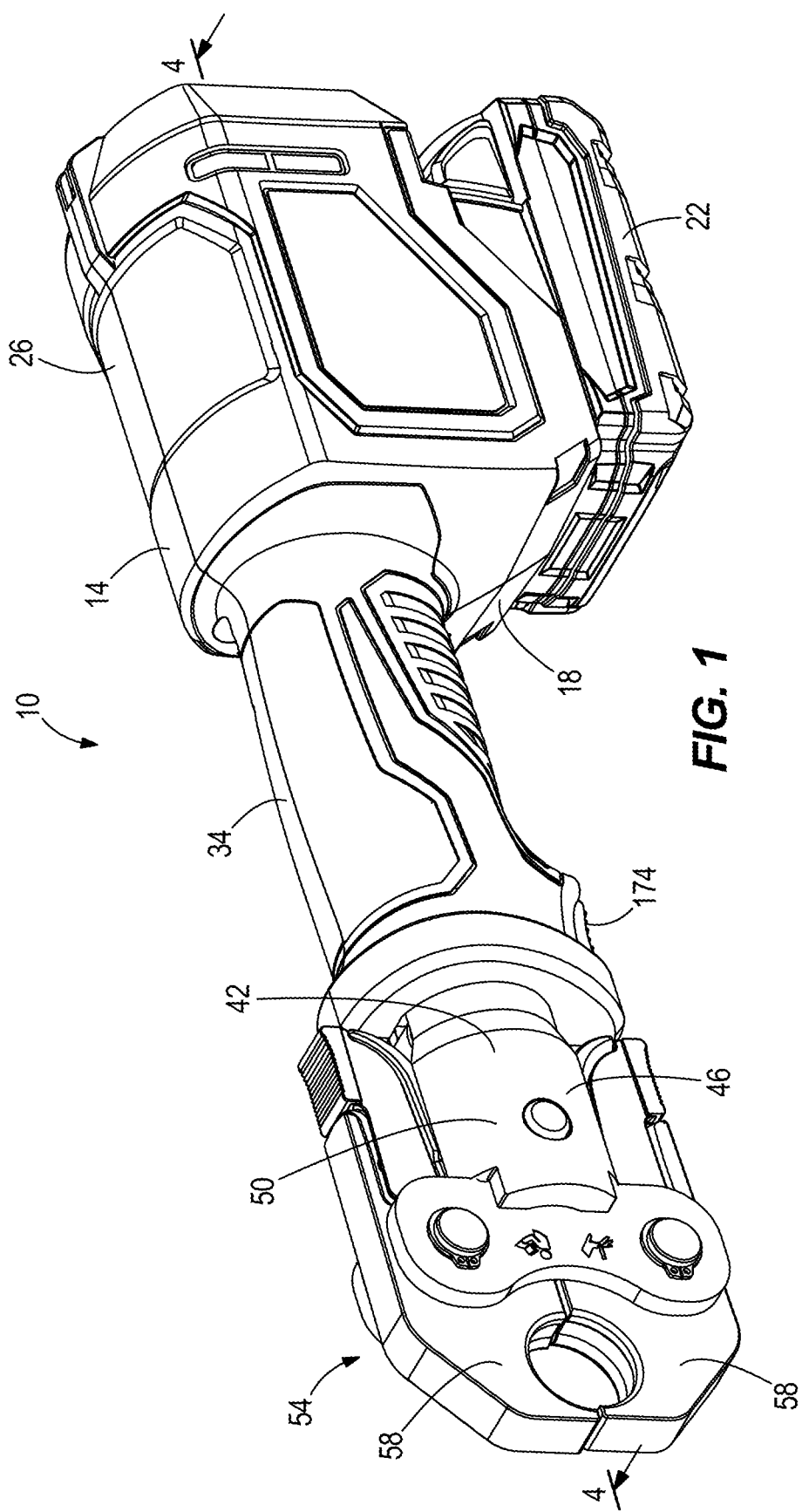
FIG. 1 is a perspective view of a PEX crimping tool in accordance with an embodiment of the invention.
Figure 2:
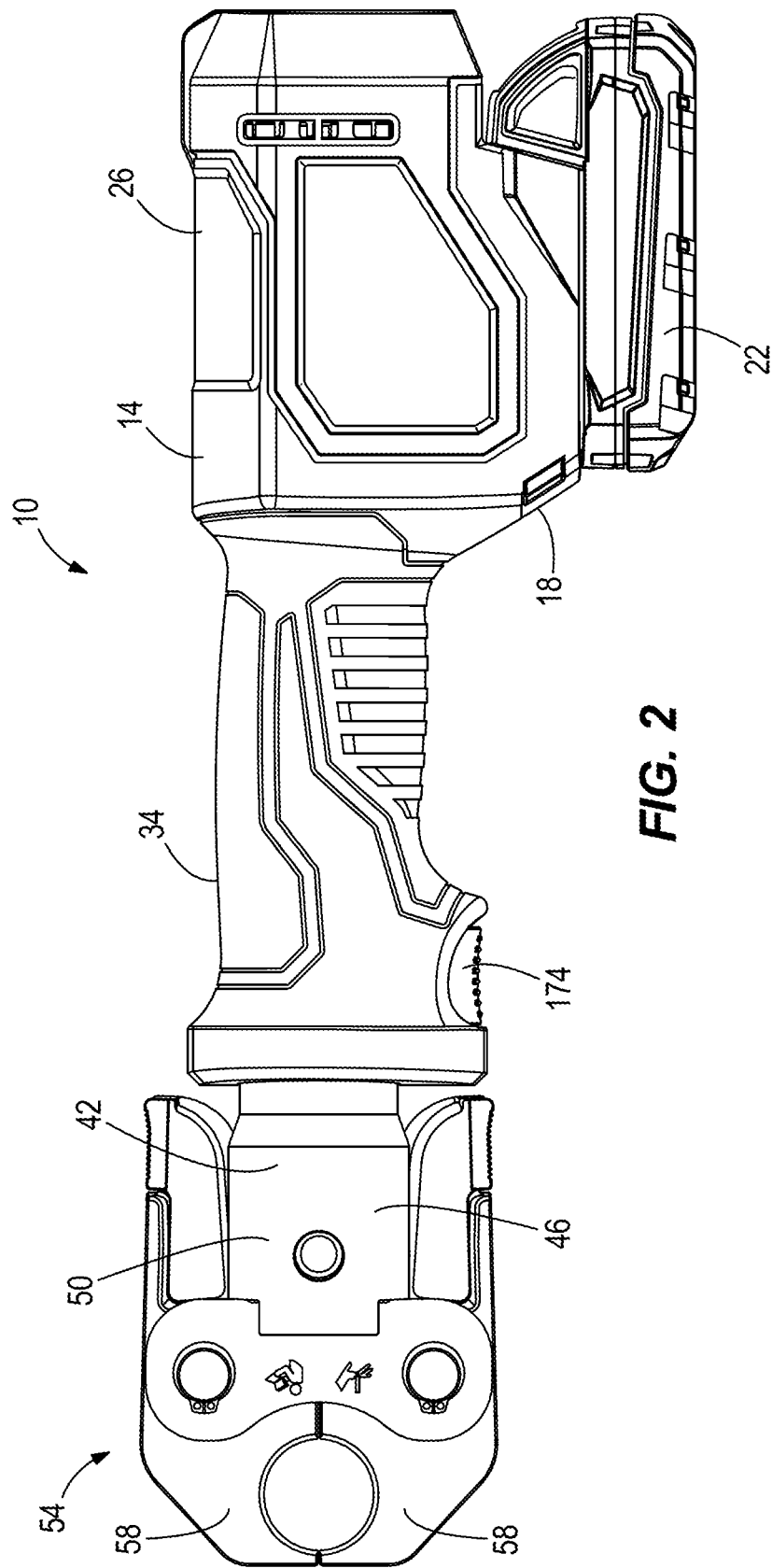
FIG. 2 is a side view of the crimping tool of FIG. 1
Figure 3:
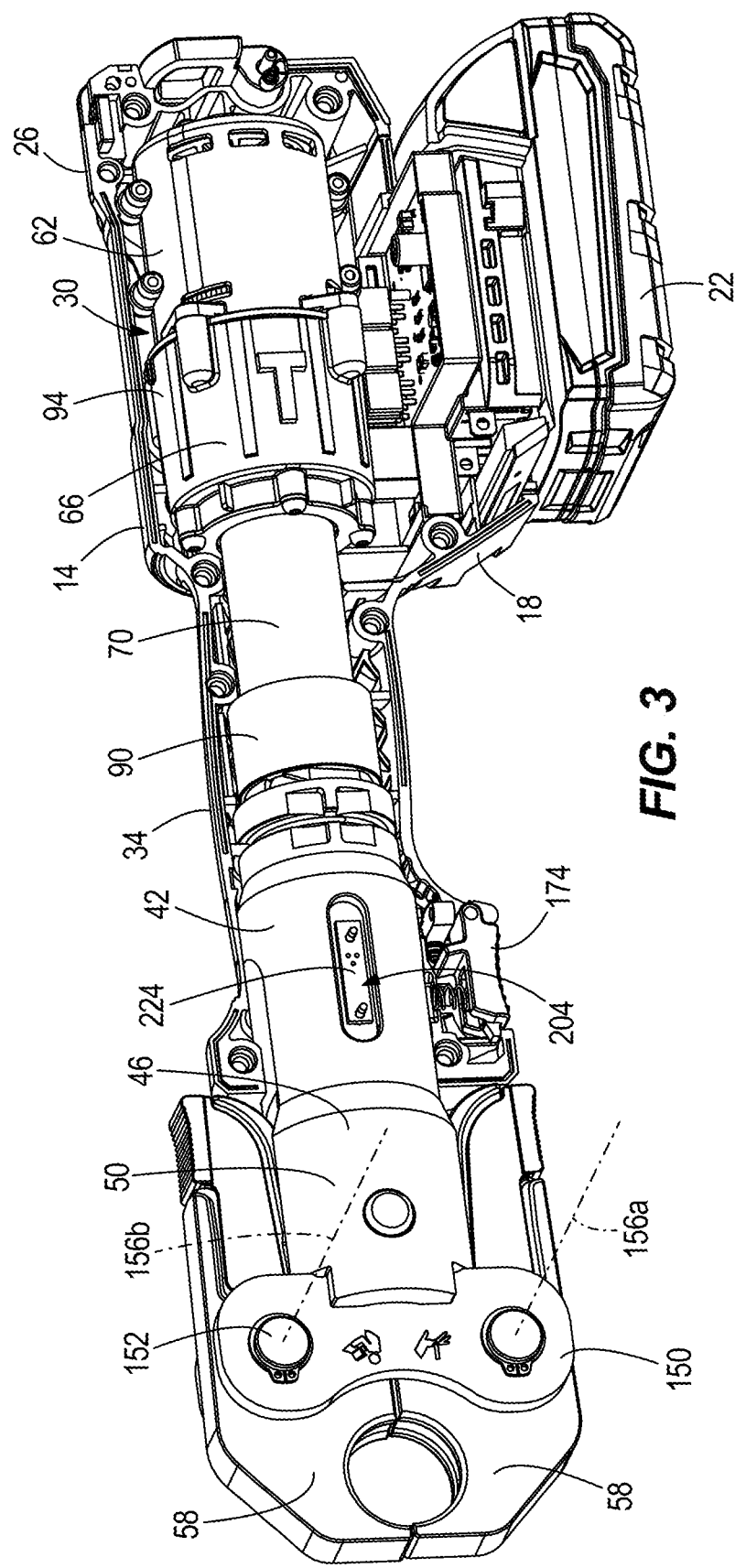
FIG. 3 is a perspective view of the crimping tool of FIG. 1 with a portion of an outer housing removed to show internal components of the crimping tool.
Figure 4:
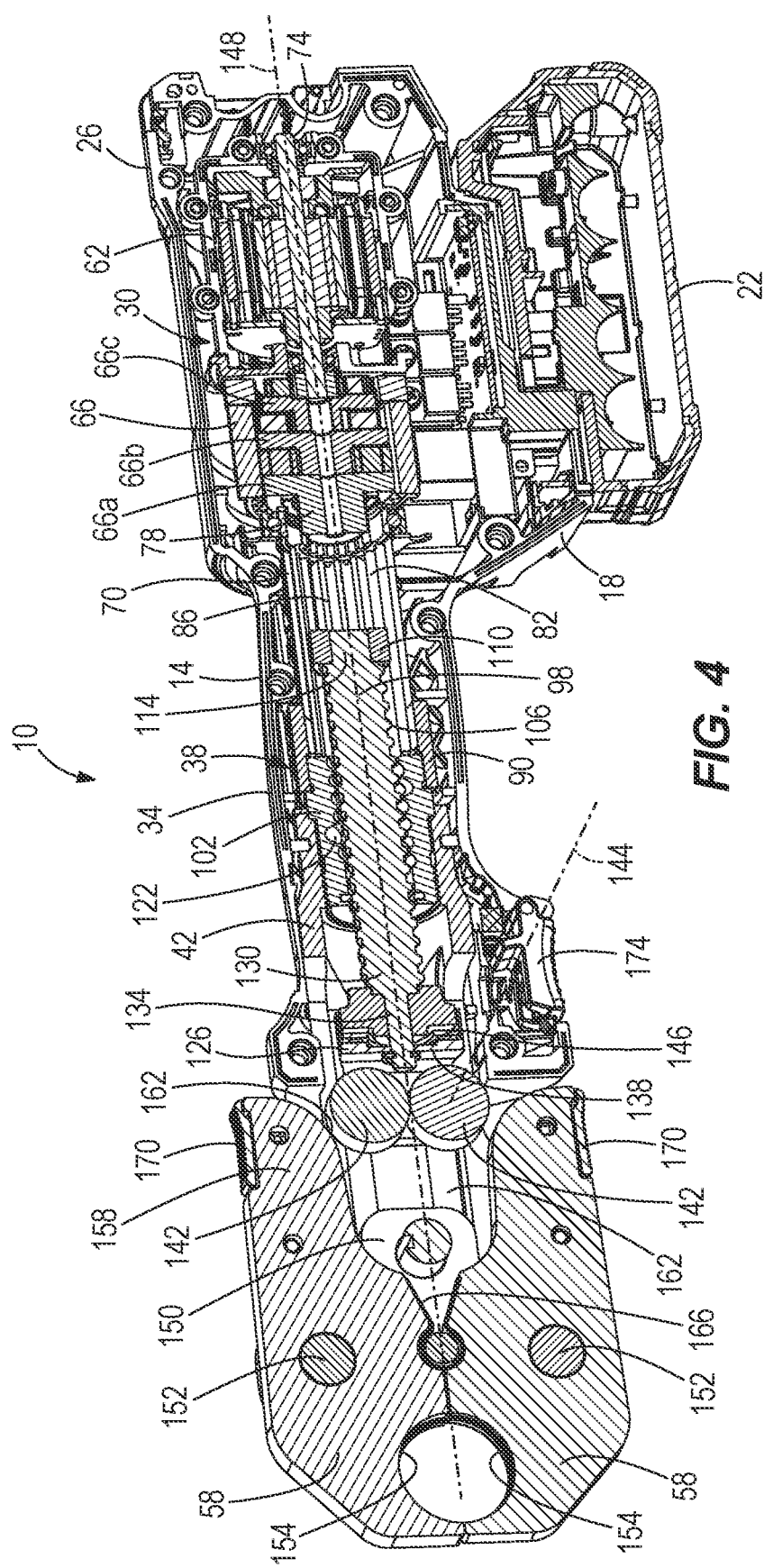
FIG. 4 is a cross-sectional view of the crimping tool of FIG. 1 through a vertical plane passing through a longitudinal axis of the crimping tool.

The crimping tool 10 includes an outer housing 14 having a battery support portion 18, a drive unit support portion 26, and a handle portion 34 configured to be gripped by a user during operation of the crimping tool 10 (FIGS. 1 and 2). With reference to FIG. 3, the battery support portion 18 supports a battery 22, which is a lithium-ion power tool battery pack in the illustrated embodiment, for providing power to the crimping tool 10. Referring to FIG. 4, the drive unit support portion 26 supports a drive unit 30, and the handle portion 34 at least partially supports a ball screw mechanism 38. A trigger 174 for operating the crimping tool 10 is provided on the handle portion 34.

With reference to FIG. 3, the crimping tool 10 also includes an inner housing 42 disposed at least partially within the handle portion 34 of the outer housing 14. In the illustrated embodiment, the inner housing 42 includes an exposed portion 46 that extends beyond a front end of the handle portion 34. The exposed portion 46 of the inner housing 42 defines a clevis 50 to which a working assembly 54 (e.g., pair of jaws 58) is pivotably and detachably coupled. As is described in more detail below, the drive unit 30 is operatively coupled to the jaws 58 to perform a crimping operation on a workpiece (e.g., a PEX fitting, not shown).

Figure 5:
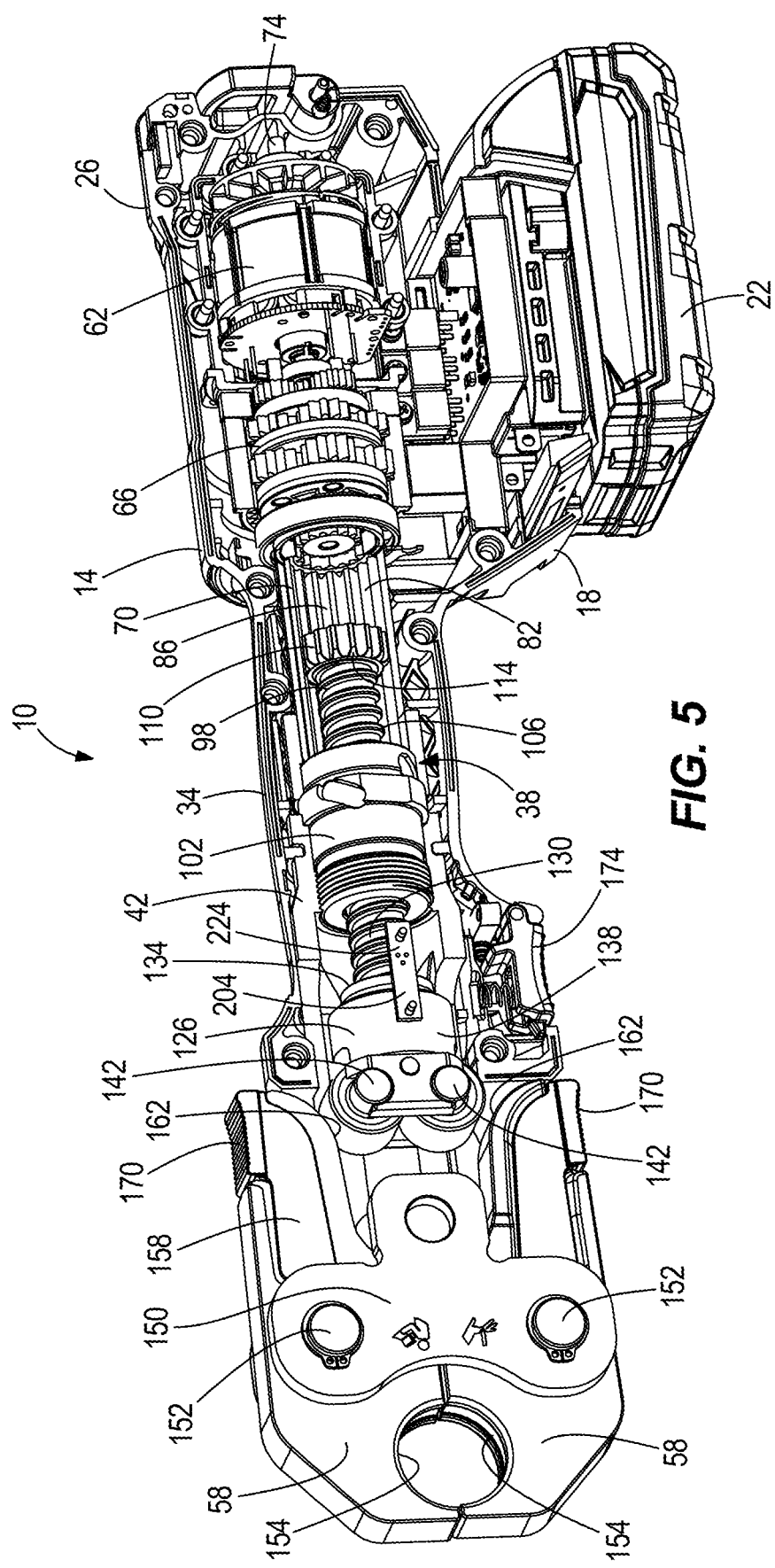
FIG. 5 is a partial cross-sectional view of the crimping tool of FIG. 1 through a vertical plane passing through a longitudinal axis of the crimping tool.

Referring to FIGS. 3-5, the drive unit 30 includes a motor 62, a transmission 66, and an output shaft 70. In the illustrated embodiment of the crimping tool 10, the motor 62 is a brushless DC electric motor 62 capable of producing a rotational output through a drive shaft 74 which, in turn, provides a rotational input to the transmission 66. In the illustrated embodiment, the transmission 66 is configured as a planetary transmission 66 having three planetary stages 66a, 66b, 66c, though any number of planetary stages may alternatively be used. The output shaft 70 is coupled for co-rotation with a carrier 78 (FIG. 4) in the third planetary stage 66a of the transmission 66 to thereby receive the torque output of the transmission 66. As shown in FIGS. 4 and 5, the output shaft 70 is configured as a hollow tube having axially extending splines 82 on an inner surface 86 thereof, and is disposed at least partially within the handle portion 34 of the outer housing 14. A distal end of the output shaft 70 is rotatably supported within the handle portion 34 by a bearing 90 (e.g., a sleeve bearing or bushing; FIG. 4).

The transmission 66 further includes a gear case or transmission housing 94 separated from the inner housing 42, but rotationally constrained with the inner housing 42 by the outer housing 14 (FIG. 3). In other words, the outer housing 14 is not merely an enclosure, but rather a structural or force-bearing member of the crimping tool 10 that exerts a reaction torque on the inner housing 42 during a crimping operation. Without such a reaction torque applied to the inner housing 42, the inner housing 42 and jaws 58 would co-rotate with the ball screw mechanism 38 (FIG. 4) in response to rotation of the output shaft 70. Accordingly, the handle portion 34 of the outer housing 14 is subject to stress during operation of the crimping tool 10, which would not be the case if the inner housing 42 were connected directly to the transmission housing 94.

Figure 7:
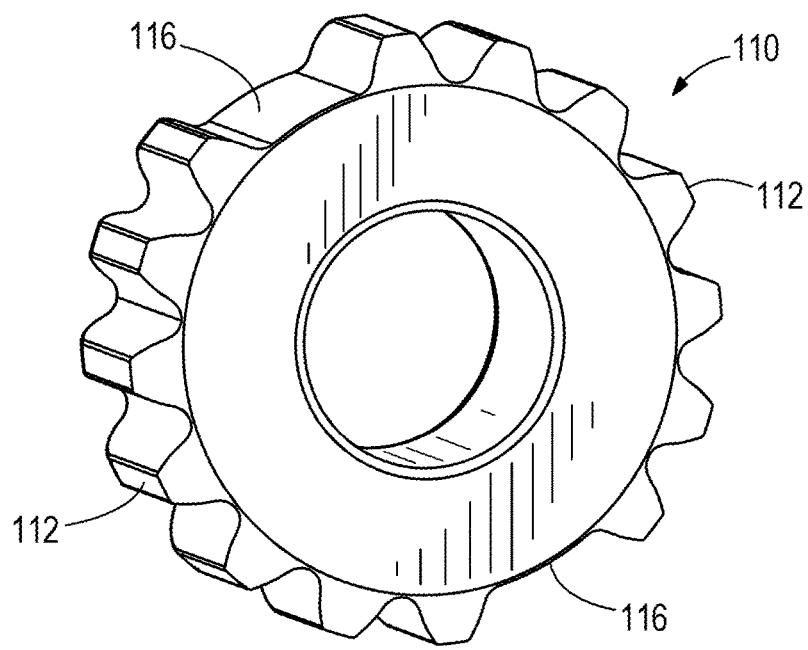
FIG. 7 is a perspective view of a splined nut of a ball screw mechanism of another embodiment of the PEX crimping tool.
Figure 8:
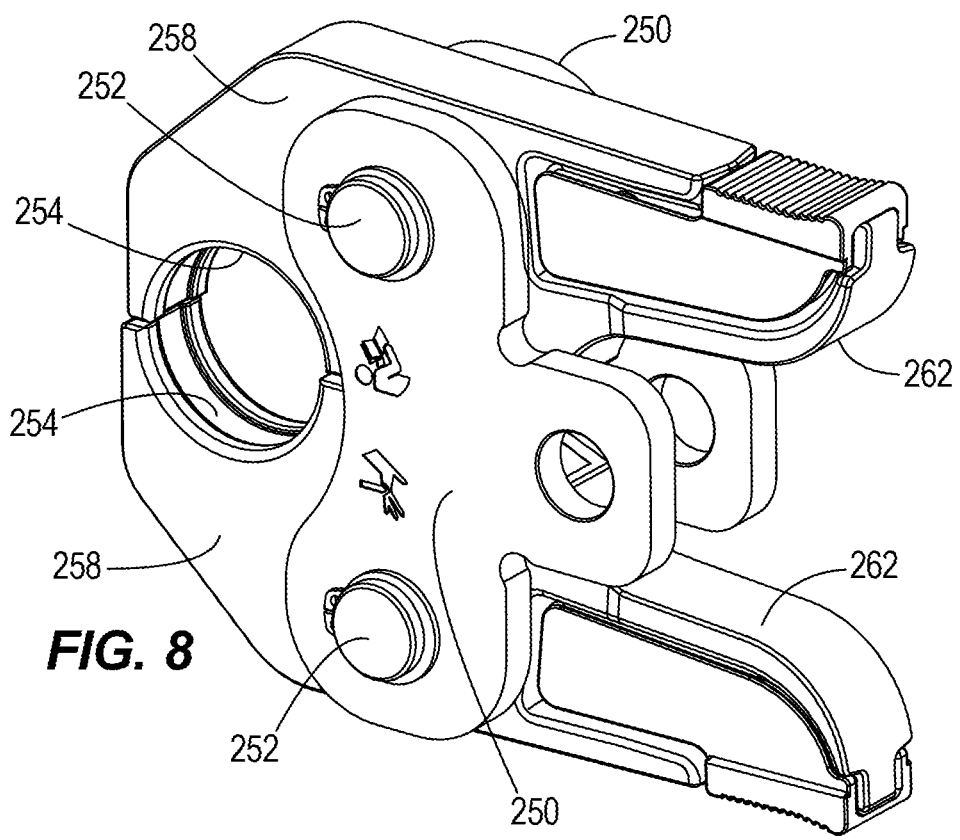
FIG. 8 is a perspective view of a pair of crimping jaws of another embodiment of the PEX crimping tool.

With reference to FIG. 4, the ball screw mechanism 38 includes an extensible member or screw 98 and a nut 102 that is fixed to the inner housing 42. The screw 98 includes a threaded outer surface 106 with which the nut 102 is engageable. A plurality of balls 122 are captured between the threaded outer surface 106 and the nut 102 to reduce friction between the screw 98 and the nut 102 and to inhibit backlash. The ball screw mechanism 38 further includes a splined nut 110 affixed to a proximal end 114 (i.e. the end closest to the drive unit 30) of the screw 98. Best illustrated in FIG. 7, the splined nut 110 includes a plurality of splines 112 disposed circumferentially about the splined nut 110, with one or more spaces 116 formed by the absence of at least one spline 112. In the illustrated embodiment, the spaces 116 are disposed approximately 180° apart and are formed by the absence of two splines 112. However, other configurations (e.g., the number of splines 112 absent from space 116, the number of spaces 116, the angular spacing of spaces 116, etc.) are possible. The splines 112 of the splined nut 110 engage the splines 82 (FIG. 5) on the inner surface 86 of the output shaft 70, thereby causing the splined nut 110 to co-rotate with the output shaft 70 while being axially movable relative to the output shaft 70. The spaces 116 facilitate the passage of air past the nut 110 to reduce pressure gradients within the ball screw mechanism 38 on opposing sides of the splined nut 110 as the splined nut 110 is axially displaced.

With reference to FIGS. 4 and 5, the crimping tool 10 also includes a roller carriage 126 coupled to a distal end 130 (i.e. the end farthest from the drive unit 30) of the screw 98. The roller carriage 126 includes a mount 134, a carriage 138 upon which two rollers 142 are supported, and a thrust bearing assembly 146 (FIG. 4) between the mount 134 and the carriage 138. The thrust bearing assembly 146 permits the screw 98 to rotate freely relative to the carriage 126, thereby permitting the inner housing 42 to restrict rotational movement of the carriage 126 while permitting axial displacement. Each of the rollers 142 is rotatable about an axis 144 oriented substantially transverse to a rotational axis 148 of the output shaft 70 and screw 98 (FIG. 4). In the illustrated embodiment, the rotational axes 144 of the respective rollers 142 are positioned on opposite sides of the rotational axis 148 of the output shaft 70 and screw 98.

With reference to FIGS. 3 and 4, the jaws 58 are pivotably coupled to a bracket 150 about respective parallel axes 156a, 156b by pins 152 (FIG. 3). Each of the jaws 58 includes a distal crimping portion 154 and a proximal arm 158 located on opposite sides of the pin (FIG. 4). Each of the arms 158 includes a cam surface 162 that is engageable with the respective rollers 142. The jaws 58 are biased toward a closed configuration by a biasing member 166, such as a leaf spring. To latch the jaws 58 to a workpiece in preparation for a crimping operation, a user may press an outer surface 170 of each of the arms 158, thereby placing the jaws 58 in an open configuration in which the crimping portions 154 of the jaws 58 are spaced from each other an amount sufficient to position the workpiece between the crimping portions 154. When the user releases the arms 158, the jaws 58 are returned toward the closed configuration by the biasing member 166 until the crimping portions of the jaws 58 engage the workpiece.

Optionally, the working assembly 54, including the jaws 58, may be detachably coupled to the clevis 50 of the inner housing 42 by any suitable manner (e.g., pin coupling, ball detent, etc.). This configuration allows multiple working assemblies to be attached to the tool, each having a different operation (e.g., crimping, cutting, expanding, etc.). The detachable coupling also facilitates the replacement of worn or damaged jaws 58.

FIGS. 8-11 illustrate an alternate embodiment of the working assembly 54, illustrated as a pair of jaws 258, which may be used in conjunction with the crimping tool 10. The jaws 258 are substantially similar to the jaws 58, with like features being shown with the same reference numerals plus "100." This description will focus on the differences between jaws 58 and jaws 258.

Figure 9:
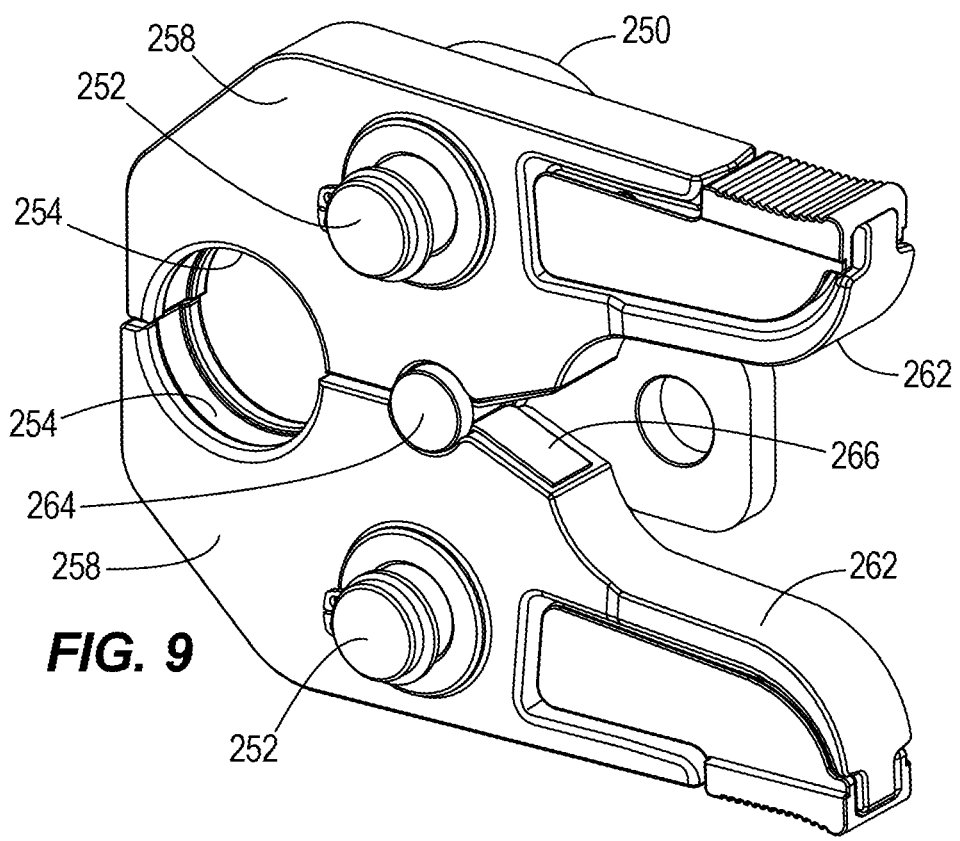
FIG. 9 is a perspective view of the crimping jaws of FIG. 8, with portions removed to expose a pivot pin and a leaf spring.
Figure 10:
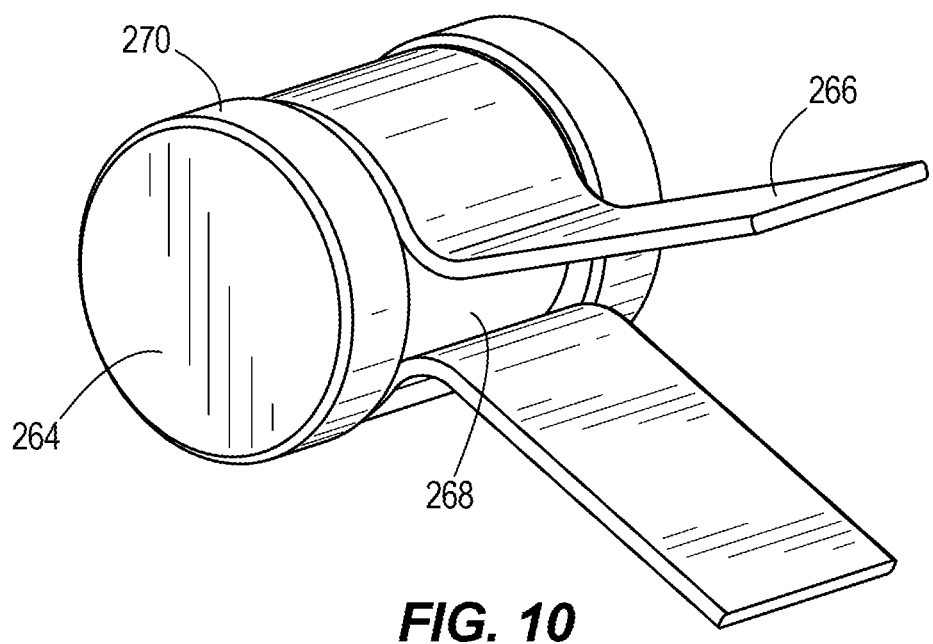
FIG. 10 is an enlarged perspective view of the pivot pin and leaf spring of FIG. 9.
Figure 11:
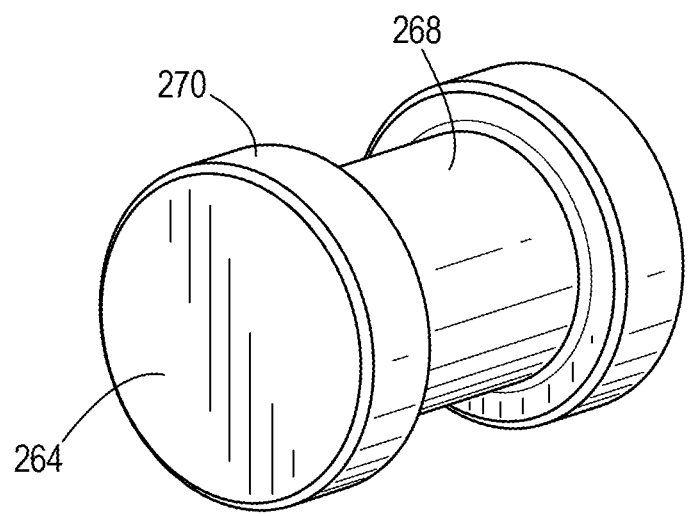
FIG. 11 is a perspective view of the pivot pin of FIG. 10.

FIG. 9 illustrates the jaws 258 with the bracket 250 removed to expose a pivot pin 264 about which the jaws 258 pivot, and the biasing member 266 (e.g., a leaf spring). With reference to FIGS. 10 and 11, the pivot pin 264 includes an outer diameter 270, which interfaces with the jaws 258 to reduce jaw mismatch and improve crimp alignment, and a circumferential groove 268 sized and shaped to receive the biasing member 266. The circumferential groove 268 is configured to maintain proper alignment of the leaf spring relative to the pivot pin 264 and the jaws 258.

Figure 6:
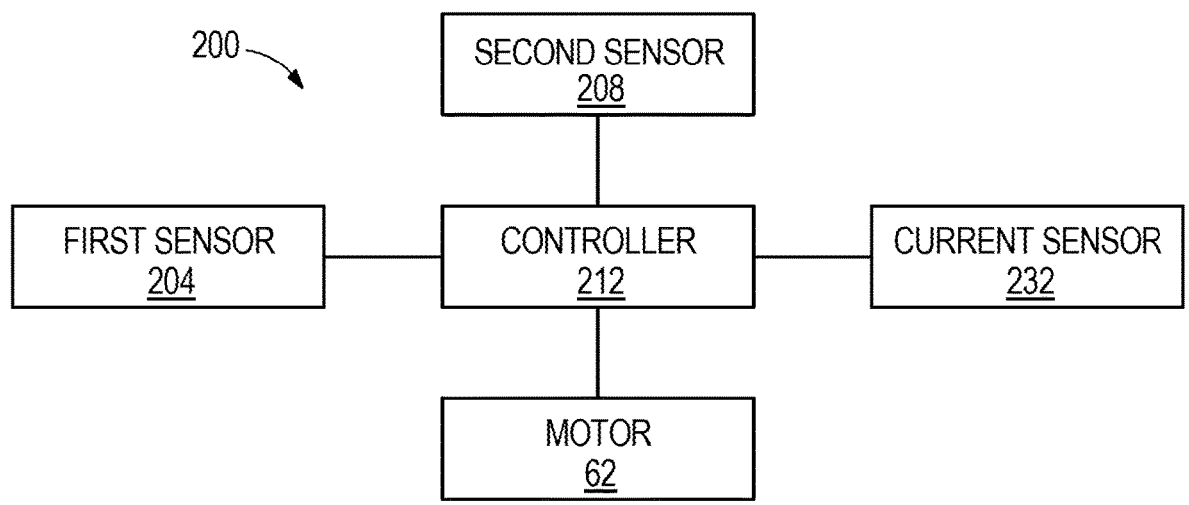
FIG. 6 is a schematic illustration of a control system used in the crimping tool of FIG. 1.

With reference to FIG. 6, the crimping tool further includes a control system 200 including a first sensor 204 disposed on the inner housing 42 for detecting the position of the roller carriage 126, a second sensor 208 associated with the motor 62, and a controller 212. As is described in greater detail below, the first sensor 204 is configured to detect the proximity of the roller carriage 126 relative to the inner housing 42 and output a corresponding first signal, while the second sensor 208 is configured to count the revolutions of the motor 62 and output a corresponding second signal. The controller 212 is capable of interpreting the first and second signals and operating the motor 62 based on the received signals.

With reference to FIGS. 3 and 5, the first sensor 204 is configured as a Hall-effect sensor mounted on a printed circuit board 224 coupled to an outer periphery of the inner housing 42. The roller carriage 126 includes a magnet (not shown) fixed to the carriage 138 so as to be axially displaceable with the carriage 138. The first sensor 204 detects the proximity of the magnet, and therefore the roller carriage 126, by detecting and measuring the magnetic field emanated by the magnet. The first sensor 204 is positioned along the length of the inner housing 42 to detect a "zero" or home position of the roller carriage 126 relative to the inner housing 42 (i.e., a position in which the roller carriage 126 is retracted so to not interfere with opening of the jaws 58 prior to a crimping operation).

The second sensor 208 (FIG. 6) is configured as a plurality of Hall-effect sensors (e.g., three Hall-effect sensors) and is incorporated within the motor 62 for counting the number of revolutions of the drive shaft 74 as it rotates in one direction (i.e., coinciding with extension of the screw 98). The second sensor 208 may also count the number of revolutions of the drive shaft 74 in the opposite direction (i.e., coinciding with retraction of the screw 98).

In some embodiments, the control system 200 may use a current sensor 232 to generate a third signal used by the controller 212. The current sensor 232 may measure the electrical current being used by the motor 62, which may drastically increase if the jaws 58 are impeded, for example, by an obstruction or a material that is too hard to crimp. In this case, the controller 212 may alter operation of the motor 62 (e.g., stopping or reversing it) to prevent damage to the tool 10 in response to the controller 212 detecting an electrical current greater than a predetermined value.

In operation of the tool 10, a user depresses the trigger 174 to provide power from the battery 22 to the motor 62, which rotates the drive shaft 74 (FIG. 4). The drive shaft 74 in turn rotates the transmission 66, which drives the output shaft 70. When the output shaft 70 rotates, the screw 98 also rotates due to the engagement between the splines 82 on the output shaft 70 and the splines 112 on the splined nut 110. As the screw 98 rotates relative to the nut 102, the threaded engagement causes the screw 98 to be axially displaced relative to the nut 102 and the inner housing 42. On the proximal end 114 of the screw 98, the splined nut 110 is allowed to slide axially along the splines 82 on the inner surface 86 of the output shaft 70. On the distal end 130 of the screw 98, relative rotation between the screw 98 and the roller carriage 126 is permitted by the thrust bearing assembly 146. Movement of the roller carriage 126, in turn, is confined to axial displacement along the inner housing 42. As the screw 98 and roller carriage 126 are axially displaced, the rollers 142 engage the respective cam surfaces 162 of the jaws 58 and apply a force normal to the cam surface 162 that acts to pivot the jaws 58 about their respective pins 152, thereby closing the jaws 58 to perform a crimping operation on the workpiece.

During a crimping operation, rotation of the output shaft 70 and screw 98 exerts a torque on the nut 102, which is ultimately transmitted to the inner housing 42. However, in response, the handle portion 34 exerts a reaction torque on the inner housing 42 to prevent the inner housing 42 from rotating relative to the handle portion 34. Accordingly, the handle portion 34 of the outer housing 14 is subject to stress and functions as a structural or force-bearing member during the crimping operation, as opposed to functioning merely as an enclosure.

Referring also to FIG. 6, during operation, the controller 212 sets a motor revolution counter to zero if the first sensor 204 detects the roller carriage 126 in the home position. If the roller carriage 126 is not in the home position, the motor 62 is operated in a reverse direction until the home position of the roller carriage 126 is detected (i.e., in response to the first sensor 204 outputting the first signal). If the roller carriage 126 is in the home position when the trigger 174 is actuated, the motor 62 drives the ball screw mechanism 38 to impart an axial displacement to the roller carriage 126 to close the jaws 58 and perform a crimping operation. During this process, the controller 212 (using the second signal provided by the second sensor 208) operates the motor 62 to turn at least a minimum predetermined number of revolutions while also monitoring electrical current used by the motor 62 (using the third signal provided by the current sensor 232) to perform a crimping operation. Once this minimum number of revolutions is reached and the amount of current drawn by the motor 62 reaches a predetermined value, the controller 212 reverses the motor 62 at a high speed to retract the roller carriage 126 and remove the rollers 142 from engagement with the respective cam surfaces 162 of the jaws 58. The controller 212 continues to operate the motor 62 in a reverse direction until the motor revolution counter returns to zero and the home position of the roller carriage 126 is detected (using the first signal provided by the first sensor 204). Thereafter, the controller 212 deactivates the motor 62, thus readying the crimping tool 10 for a subsequent crimping operation upon actuation of the trigger 174.

Furthermore, the controller 212 is also operable to detect a foreign object overloading the jaws 58. In such operation, the trigger 174 is actuated, and the motor 62 drives the ball screw mechanism 38 to impart an axial displacement to the roller carriage 126 to close the jaws 58 and attempt to perform a crimping operation. During this process, the controller 212 monitors the current being drawn by the motor 62 (using the third signal provided by the current sensor 232) and counts the number of revolutions of the motor (using the second signal provided by the second sensor 208). If the controller 212 detects the current being drawn by the motor 62 is greater than a predetermined value for a specified number of motor revolutions (e.g., the motor is highly loaded too early in the crimping operation), the controller 212 reverses the motor 62. The controller 212 continues to operate the motor 62 in a reverse direction until the motor 62 revolution count returns to zero and the home position of the roller carriage 126 is detected (using the first signal provided by the first sensor 204).

In some embodiments, the controller 212 may employ a similar operational method when the working assembly 54 is detached from the tool 10. Specifically, upon actuation of the trigger 174, the motor 62 drives the ball screw mechanism 38 to impart an axial displacement to the roller carriage 126. During this process, the controller 212 monitors the current being drawn by the motor 62 (using the third signal provided by the current sensor 232) and counts the number of revolutions of the motor (using the second signal provided by the second sensor 208). If the controller 212 detects that the motor 62 has reached a predetermined number of revolutions and the current being drawn has not changed significantly (as a result of no reaction forces being imparted to the missing working assembly 54), the controller 212 reverses the motor 62 until the motor revolution counter returns to zero and the home position of the roller carriage 126 is detected (using the first signal provided by the first sensor 204). The controller 212 may also be operable to alert the user that a working assembly 54 is not coupled to the tool 10.

The power tool 10, as described above, is advantageous in that it provides an inline, compact drive configuration while limiting the number of parts necessary to maintain strength and stability. In particular, using the handle portion 34 of the outer housing 14 as a structural or force-bearing member eliminates the need and attendant cost of additional material for directly connecting the inner housing 42 and the transmission housing 94. The tool also provides an electronic control system 200 to count motor revolutions, detect a home position of the roller carriage 126, and/or measure motor current to enhance the quality and repeatability of tool functions (e.g., crimping).

Various features of the invention are set forth in the following claims.

What is claimed is:

1. A power tool comprising:
    an outer housing including a drive unit support portion, a battery support portion, and a handle portion, wherein an actuator configured to operate the power tool is provided on the handle portion;
    an inner housing positioned at least partially within the outer housing;
    a drive unit positioned in the drive unit support portion and including an output member;
    a battery removably coupled to the battery support portion;
    a power screw mechanism including
        a nut fixed relative to the outer housing, and
        a screw coupled for co-rotation with the output member and movable along an axis relative to the output member, wherein the screw is in threaded engagement with the nut such that the screw moves axially in response to rotation of the screw relative to the nut; and
    a working assembly coupled to the inner housing for movement in response to axial movement of the screw,
    wherein the screw extends longitudinally through the handle portion between the output member and the working assembly,
    wherein the drive unit support portion is adjacent each of the handle portion and the battery support portion, the axis extending through the drive unit support portion, and
    wherein the battery support portion is offset from the axis such that the axis does not extend through the battery support portion.

2. The power tool of claim 1, further comprising a roller carriage coupled to the screw for axial movement therewith between a retracted position and an extended position,
    wherein the working assembly includes a plurality of jaws engageable with the roller carriage such that movement of the roller carriage from the retracted position toward the extended position moves the jaws toward a closed position.

3. The power tool of claim 1, further comprising a splined member fixed to the screw, the splined member including a plurality of external splines,
    wherein the output member includes a plurality of internal splines meshed with the external splines of the splined member.

4. The power tool of claim 3,
    wherein the plurality of external splines includes a first spline, a second spline adjacent the first spline, and a third spline adjacent the second spline,
    wherein the second spline is circumferentially spaced from the first spline by a first distance, p1 wherein the third spline is circumferentially spaced from the second spline by a second distance, and
    wherein the second distance is greater than the first distance to define a gap in the plurality of splines between the second spline and the third spline.

5. The power tool of claim 1, wherein the handle portion exerts a reaction torque on the inner housing in response to the relative rotation between the nut and the screw to prevent the inner housing from rotating relative to the outer housing.

6. The power tool of claim 1, wherein the output member is at least partially positioned within the handle portion.

7. The power tool of claim 1, wherein the output member includes a hollow tube within which the screw is at least partially received.

8. The power tool of claim 1, wherein the drive unit includes a motor and a transmission coupled to the motor for receiving torque therefrom, and wherein the output member is drivably coupled to an output of the transmission.

9. The power tool of claim 1, wherein the inner housing is spaced apart from the drive unit support portion.

10. The power tool of claim 1, wherein the working assembly includes first and second jaws pivotally coupled to the inner housing, a pin positioned between the first and second jaws, and a biasing member coupled to the pin, the biasing member configured to bias the first and second jaws toward a closed position.

11. The power tool of claim 10, wherein the pin includes a circumferential groove that receives the biasing member.

12. A power tool comprising:
    an outer housing including a drive unit support portion and a handle portion;
    an inner housing positioned at least partially within the outer housing;
    a drive unit positioned in the drive unit support portion and including an output member;
    a roller carriage movable between a retracted position and an extended position in response to rotation of the output member; and
    a working assembly movable in response to contact with the roller carriage, the working assembly including
        first and second jaws pivotally coupled to the inner housing,
        a pin positioned between the first and second jaws and including a circumferential groove, and
        a biasing member received by the circumferential groove, the biasing member configured to bias the first and second jaws toward a closed position.

13. The power tool of claim 12, wherein the inner housing is spaced apart from the drive unit support portion.

14. The power tool of claim 13, further comprising a screw coupled for co-rotation with the output member, wherein the screw is at least partially positioned within the handle portion, and wherein an actuator for operating the power tool is provided on the handle portion.

15. A power tool comprising:
- an outer housing including a drive unit support portion and a handle portion;
- an inner housing positioned at least partially within the outer housing;
- a drive unit positioned in the drive unit support portion and including an output member having a plurality of internal splines;
- a power screw mechanism including
  - a nut fixed relative to the outer housing,
  - a screw in threaded engagement with the nut such that the screw moves axially in response to rotation of the screw relative to the nut, and
  - a splined member fixed to the screw, the splined member including a plurality of external splines meshed with the internal splines of the output member, the plurality of external splines including a first spline, a second spline adjacent the first spline, and a third spline adjacent the second spline; and
- a working assembly coupled to the inner housing for movement in response to axial movement of the screw,
- wherein the second spline is circumferentially spaced from the first spline by a first distance,
- wherein the third spline is circumferentially spaced from the second spline by a second distance, and
- wherein the second distance is greater than the first distance to define a gap in the plurality of splines between the second spline and the third spline.

16. The power tool of claim 15, wherein the output member is at least partially positioned within the handle portion.

17. The power tool of claim 16, wherein the output member includes a hollow tube within which the screw is at least partially received.

* * * * *